Jan. 3, 1967

D. D. KYZER 3,295,623

SUSPENSION FOR DRIVEN MULTIPLE AXLE
OVERLAND TRANSPORT VEHICLE

Filed April 23, 1963

David D. Kyzer,
INVENTOR.

BY Fraser and Bogucki

Attorneys

David D. Kyzer,
INVENTOR.

BY Fraser and Bogucki
Attorneys

David D. Kyzer,
INVENTOR.

BY Fraser and Bogucki
Attorneys

United States Patent Office 3,295,623
Patented Jan. 3, 1967

3,295,623
SUSPENSION FOR DRIVEN MULTIPLE AXLE
OVERLAND TRANSPORT VEHICLE
David D. Kyzer, Spenard, Alaska
(1601 E. 1st Ave., Anchorage, Alaska 99501)
Filed Apr. 23, 1963, Ser. No. 275,034
2 Claims. (Cl. 180—23)

This invention relates to transport vehicles, and more particularly to a wheeled vehicle designed for off-the-road transport over uneven, soft or slippery terrain.

Most transport vehicles, such as trucks, are designed for hauling loads over roads which vary in quality from rough dirt roads, such as may be carved out by a bulldozer, to high-speed superhighways and expressways. In particular parts of the United States, notably in Alaska, there is particular need for a transport vehicle which is capable of traveling and carrying loads over terrain where there are no roads. The surface conditions of such terrain may vary with the seasons, being covered with relatively deep snow in the wintertime and presenting a soft marshy surface in warmer seasons. In any event, such terrain is usually rough and uneven, being frozen in the wintertime, a morass of marshy hummocks and chuckholes in the summertime, and generally interspersed with rocks and other obstacles. Conventional transport vehicles with only two or three load carrying axles are quite unsatisfactory for off-the-road transport, particularly over terrain of the type described.

In order to distribute the load to the terrain more evenly in a transport vehicle designed for overland, off-the-road transport, additional axles and wheels may be provided. However, unless specific means are provided for equalizing the loads at the respective wheels, substantial overloads at the individual tires and axles will still be encountered as the vehicle traverses particularly rough or uneven terrain. Moreover, the addition of so-called idler axles and wheels, while they may be effective in helping to distribute the load, increases the problem of obtaining adequate traction in traversing soft or slippery terrain.

Particular vehicles have been developed previously which incorporate fluid suspension systems to provide for the equalization of the weight which is applied to each individual wheel. Such vehicles as are known, however, have been directed to the incorporation of a fluid suspension system in a truck comprising a pair of axles, which vehicles are not suitable for general use in off-the-road transport. In such previously known arrangements, even though fluid suspension may be employed to equalize the load between the drive wheels and the idler wheels of a particular vehicle, the problem of obtaining adequate traction to permit the vehicle to travel satisfactorily over any reasonable terrain which may be encountered in off-the-road hauling remains unsolved.

It is therefore an object of the present invention to provide a particular transport vehicle having a combined suspension system and drive system which render the vehicle particularly suitable for off-the-road transport.

It is a more particular object of the present invention to provide an overland transport vehicle having substantially equal distribution of load over all of its wheels under virtually any condition of terrain which may be encountered.

It is a further object of the present invention to provide an overland transport vehicle capable of maintaining adequate traction at the drive wheels thereof under substantially all conditions of terrain.

It is a still further object of the invention to provide a suspension system for an overland transport vehicle which is also suitable for operation at highway cruising speeds.

These and other objects of the present invention are realized in a particular embodiment thereof which is peculiarly adapted for transporting heavy loads over rough or soft and mushy terrain or frozen terrain with deep snow, without dependence upon roads or graded surfaces. In brief, the invention comprises a wheeled vehicle which has a substantial plurality of axles and wheels distributed over substantially its entire length. Each wheel associated with the load carrying portion of the transport is individually suspended therefrom by an extendible cylinder which encloses a suitable fluid. All of the cylinders suspending the wheels on the same side of the vehicle are coupled by means of individual flexible couplings to a longitudinally extending header tube, two such tubes being provided for the two sides of the vehicle. Thus the wheel suspension cylinders arranged along the same side of the vehicle are all intercoupled in a manner permitting the transfer of fluid from one to another via the associated header tube and flexible couplings. This arrangement, in accordance with the invention, permits an equalization of load at the various wheels as the vehicle travels over rough and uneven terrain, thus permitting the vehicle to transport heavy loads without dependence upon established roads. The suspension system in accordance with the invention is not limited to the use of any particular fluid. For example, the system may be completely hydraulic, i.e. utilizing a suitable liquid as the load equalizing fluid; it may be entirely pneumatic, utilizing only air or some other suitable gas under pressure; or it may comprise a combination hydraulic-pneumatic system utilizing both a liquid and a gas in the fluid portions of the system.

In accordance with one particular aspect of the invention, an additional cushioning effect is provided in a combination hydraulic-pneumatic suspension arrangement by virtue of compression tanks which are individually coupled to the aforementioned header tubes. In such an arrangement the wheel suspension cylinders and the header tubes are preferably filled to a substantial extent with a suitable liquid, such as oil or hydraulic fluid, while the compression tanks are substantially filled with air. The provision of compression tanks in this manner advantageously achieves a shock absorbing effect which is particularly desirable in higher speed, highway transport.

In addition, in accordance with a further aspect of the invention, each axle is individually powered by means of drive shafts which couple respective axles to the engine. The application of driving power to each wheel serves to provide maximum traction for the vehicle. Thus, the overland transport vehicle of the present invention advantageously is arranged to provide a uniform load distribution over a plurality of wheels which are distributed along the length of vehicle and is further arranged to achieve equal traction at all wheels for driving the vehicle. By this arrangement, the vehicle is rendered capable of negotiating terrain which may be rough or soft and marshy or covered with snow, thus providing for the transportation of freight to areas which have hitherto been inaccessible by truck, at least for substantial portions of the year.

In one particular arrangement in accordance with the invention, a truck is provided having a cab and engine positioned over a pair of axles near the front of the vehicle with four more axles substantially equally distributed along the extent of the load carrying portion of the truck. The four front wheels on the two front axles are steerable and are provided with separate power steering units being controlled by a common activator. The two front axles are provided with conventional "walking beam" leaf springs. However, all the wheels under the load carrying section of the vehicle are independently suspended by individual hydraulic cylinders which are interconnected via a separate hydraulic suspension system for each side of the vehicle. Each of the axles includes a differential gear arrangement which is driven by shafts and universal joints coupled to receive power from the engine and transmission. The universal joints and splined couplings are incorporated in the drive shaft to permit a flexibility of movement between the axles and the respective transmission, gear boxes and transfer cases. Individual axles are enabled to move independently of one another with a considerable degree of flexibility by virtue of the inclusion of sway braces, or bars, with flexible knuckle ends. Lateral movement of an axle as a result of vertical wheel movement is controlled by a single sway bar fastened to the frame at one side of the truck. Similarly, longitudinal motion is permitted by the use of sway bars connected to the truck frame at one end and to the truck axle at the other end. Along one side of the truck, this is accomplished by the use of a single sway bar for each axle. On the other side of the truck, however, a pantograph of double sway braces is provided in order to prevent the axle housing from rotating undesirably. Extending substantially the entire length of the truck bed or load carrying portion thereof are a pair of header tubes. Each of the hydraulic wheel suspension cylinders along one side of the truck is connected to a corresponding header tube for that side by means of individual flexible hose couplings. As the vehicle traverses uneven terrain, the portion of the load which is carried by each wheel is maintained substantially constant, relative to the other wheels, by the transfer of fluid between the individual wheel cylinders and the associated header tube. Thus as a particular wheel tends to rise in passing over an obstacle, its individual suspension cylinder retracts as fluid is forced from the cylinder into the header tube. In one particular arrangement, the header tube is filled with fluid when the cylinders are all 50% extended. Thus as the fluid is driven from an individual wheel cylinder into the header tube, it is further forced from the header tube to the remaining interconnected wheel cylinders to achieve the desired equal distribution of the load despite unevenness of the terrain. Since each of the wheels is coupled to the same driving torque from the engine, it may be seen that the traction at the various wheels is equalized as the distribution of the load over the various wheels and axles is evenly distributed, regardless of terrain encountered, with the result that traction for the overall vehicle is maximized. Thus the vehicle is enabled, by virtue of the present invention, to negotiate overland terrain and is not restricted or limited to areas which are served by graded roads.

A better understanding of the present invention may be had from a consideration of the following description, taken in conjunction with the drawings, in which.

Figure 1:
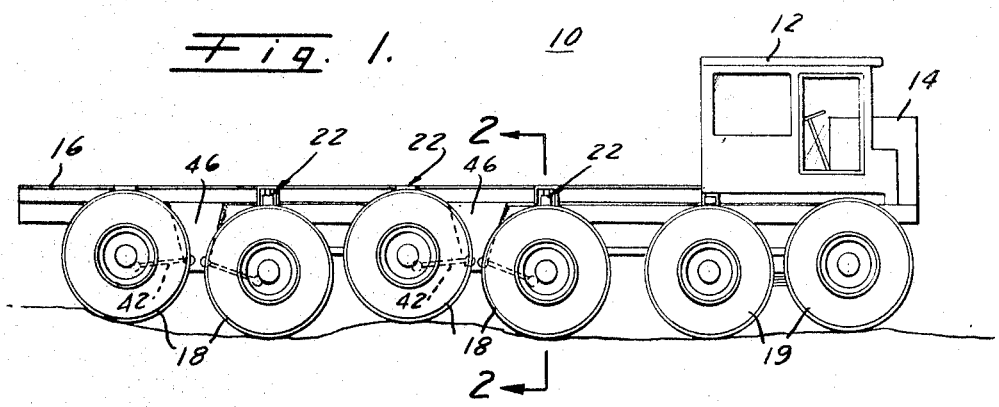
FIG. 1 is a side view of one particular arrangement in accordance with the invention.
Figure 2:
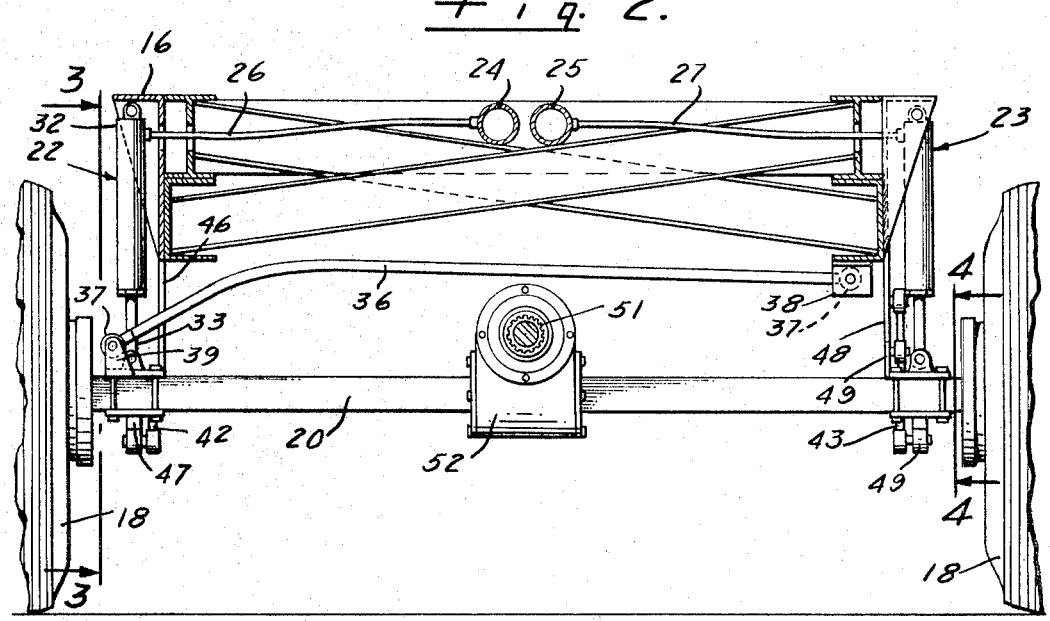
FIG. 2 is a sectional view of the arrangement shown in FIG. 1, taken along the line 2—2.
Figure 3:
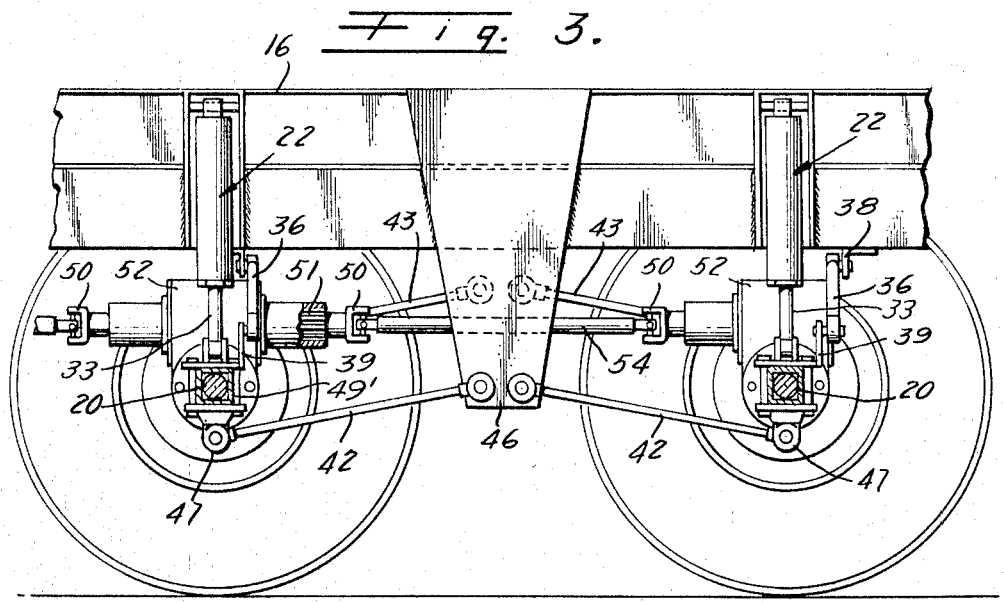
FIG. 3 is a sectional view of the portion shown in FIG. 2, taken along the line 3—3.

As represented in FIG. 1 one specific arrangement in accordance with the present invention is shown generally comprising a truck 10 having a cab 12 and an engine compartment 14 mounted near the front end of a longitudinally extending frame 16 which is supported by a plurality of wheels 18 and 19. The wheels 18, under the bed or load carrying portion of the truck 10, and the wheels 19 under the cab 12 are mounted on axles which are spatially distributed with substantially equal spacing over the entire length of the truck 10. The wheels 19 are arranged in a conventional "walking beam" arrangement utilizing leaf springing which permits equalization of load distribution between the two sets of front wheels supporting the cab 12 and the engine 14. The wheels 18 under the bed of the truck 10 are mounted on individual axles 20, each of which is suspended from the truck frame 16 by means of individual fluid pressure cylinders 22 and 23 at each end of an axle 20. Particular portions of the suspension system for the truck 10 are shown in greater detail in FIGS. 2, 3, 4 and 5. As is best shown in FIGS. 2 and 3, each suspension cylinder, such as the cylinder 22, is connected with its housing 32 fastened to the truck frame 16 and has an actuator shaft 33, connected to an internal piston (not shown), fastened to a support member 49' which in turn is secured on the axle 20.

A flexible hose 26 is coupled to the upper portion of the cylinder 22 and a header tube 24 which is similarly coupled to all of the cylinders 22 on one side of the vehicle. A similar header tube 25 is provided on the other side of the vehicle and coupled to the cylinders 23 by individual flexible hoses 27.

Figure 5:
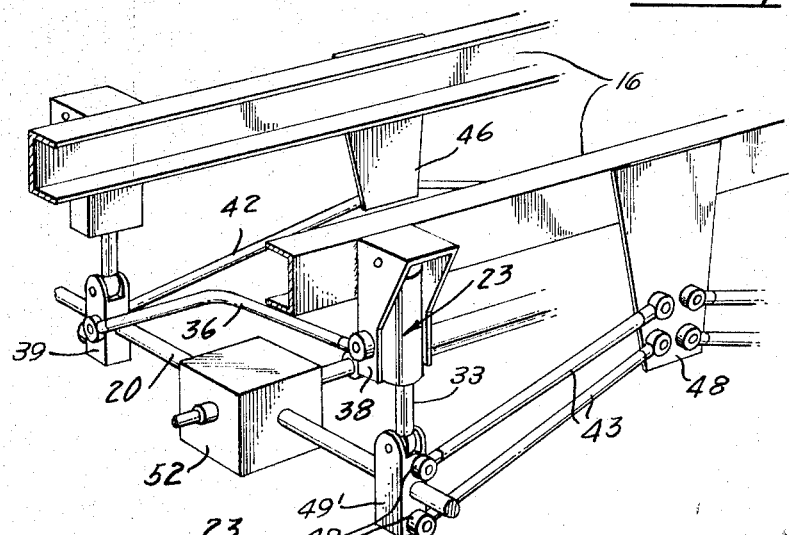
FIG. 5 is a schematic representation of a portion of the arrangement of the present invention shown in FIGS. 1 to 4.
Figure 4:
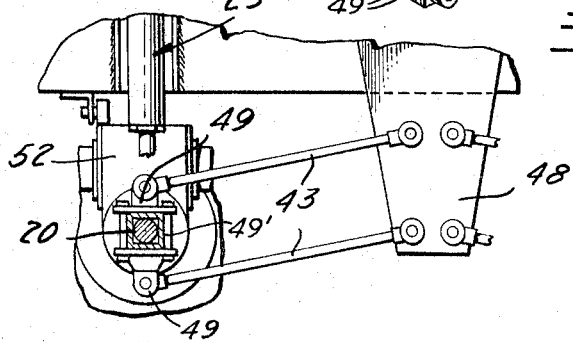
FIG. 4 is a cutaway sectional view of the portion shown in FIG. 2, taken along the line 4—4.

In order to facilitate the up and down motion of the wheels on an individual basis to follow a terrain contour as the vehicle is used, various sway braces and stabilizer bars are provided in the described arrangement of the invention. Thus, each individual axle 20 under the load carrying portion of the truck 10 is permitted to rotate about an axis directed along the length of the truck 10 by virtue of the fluid suspension system particularly including the individual expandible cylinders 22, 23, but is constrained in a transverse position relative to the truck frame 16 by means of a sway bar 36 having flexible knuckle ends 37. The sway bar 36 is attached at one end to a frame bracket 38 and at the other end to an axle bracket 39, thereby controlling the lateral movement of the axle 20 as a result of vertical wheel movement. As seen in FIG. 5, longitudinal sway braces 42 and 43 are provided to control the longitudinal and rotational motions of the axle 20. A single longitudinal sway bar 42 is provided on one side of the vehicle anchored between a frame bracket 46 and an axle bracket 47. On the opposite side of the vehicle a pair of sway bars 43 are connected between a frame bracket 48 and a pair of axle brackets 49. The two sway bars 43 on one side of the vehicle are connected in a pantograph configuration in order to restrict the rotational movement of the housing of the axle 20 while limiting longitudinal motion of the axle as it moves vertically in response to bumps or other unevenness in the terrain.

Additional facility in the independent vertical motion of each separate wheel 18 and axle housing 20 under the load carrying portion of the truck 10 is achieved by the provision of universal joints 50 and splined couplings 51 at each end of the drive shafts leading to the differential gear housings 52 of the respective axles 20. In this arrangement of the invention, a drive system is provided which applies positive driving torque to each individual truck axle. A combination of direct drive at each axle (and thereby at each wheel) together with the above described suspension system which permits free movement of each individual wheel to follow the contour of the terrain advantageously serves to develop an equalized driving force at each wheel and thus provide maximum traction for the vehicle, regardless of the terrain which is encountered. Thus the universal joints 50 and the splined drive shaft couplings 51, incorporated in the drive train at each axle, adapt the drive trains so that torque may be readily transmitted thereby without interfering with the free vertical motion of each individual wheel.

Figure 6:
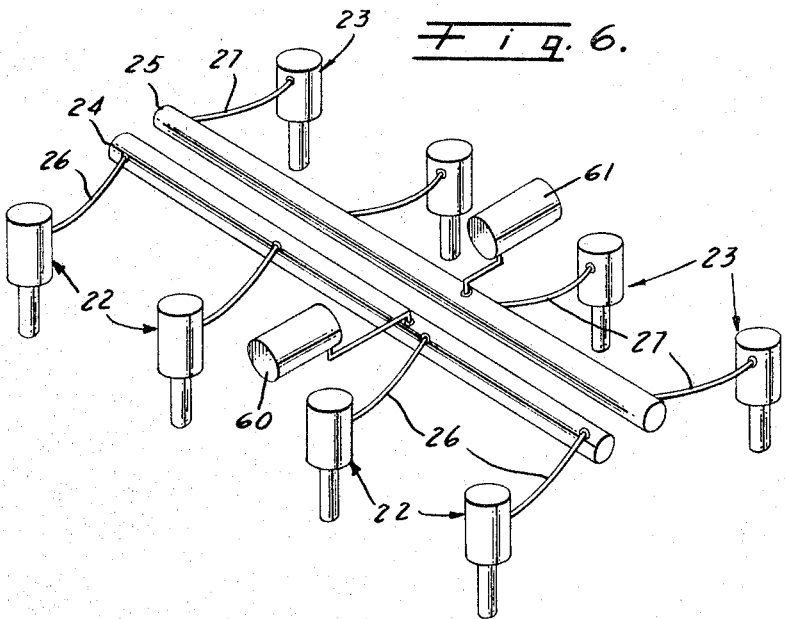
FIG. 6 is a schematic arrangement of the hydraulic suspension system of the prevent invention; and, FIG. 7 is a schematic diagram representing the drive system of the present invention.

The principles of operation of the above described particular arrangement in accordance with the invention may be better explained by reference to the schematic diagrams of FIGS. 6 and 7. FIG. 6 represents a hydraulic suspension system of the invention in schematic form and shows the individual wheel cylinders 22 and 23 coupled respectively to header tubes 24 and 25 via flexible couplings 26 and 27. Compression tanks 60 and 61 are also shown coupled to the header tubes 24 and 25 respectively. In one preferred arrangement, the cylinders 22, 23 and header tubes 24, 25 are filled with hydraulic fluid when the cylinders 22, 23 are 50% expanded. For off-the-road hauling, the compression tanks 60, 61 may be omitted from the system or they may be valved off by suitable valves (not shown). The compression tanks 60 and 61, when used, are preferably filled with a gas under pressure and serve to cushion the shock of high speed over-the-road travel. As the vehicle is operated, each individual wheel coupled to its associated suspension cylinder, 22 or 23, tends to move up and down in following the terrain over which the truck is passing. With a conventional suspension system depending upon mechanical springing, the tendency to up-and-down motion would result in a shifting of the weight borne by each wheel with the undesirable result that individual tires may be seriously overloaded beyond their designed weight capacities. With the suspension system of the present invention, however, the vertical movement of an individual wheel results in the passage of fluid via a flexible coupling, 26 or 27, between an individual wheel cylinder 22 or 23 and its associated header tube 24 or 25. The change in fluid pressure resulting therefrom is coupled throughout the portion of the system on that side of the vehicle to all of the other individual wheel cylinders such as the cylinders 22. As a result, the tendency toward an increase in load at any particular wheel resulting from that wheel encountering a bump or hillock is transmitted to the other wheel cylinders on the same side of the vehicle so that the change in load is shared by the individual wheels associated therewith.

Figure 7:
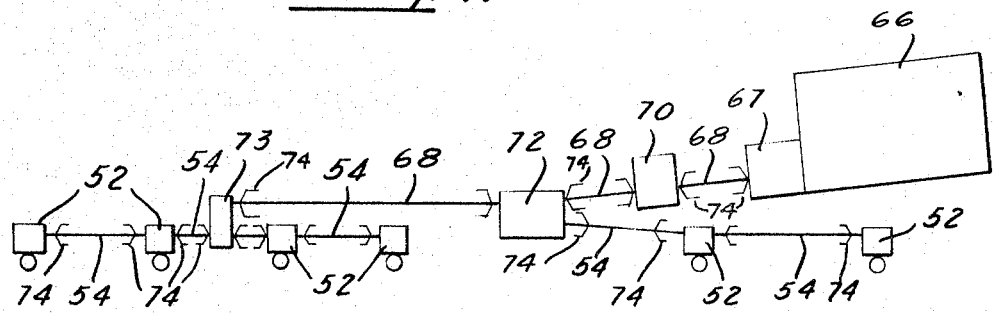

The load distributing capability presented by the fluid suspension system of the present invention is of particular advantage in the particular arrangement thereof incorporating the drive system represented in the power train schematic of FIG. 7. This shows an engine 66 arranged to supply power to a five-speed transmission 67. The power train then continues via a drive shaft 68 to a three-speed gear box 70, another drive shaft 68 and a transfer case 72. From the transfer case 72, power is taken via still another drive shaft 68 to another transfer case 73 which is associated with a portion of the power train driving the wheels under the load carrying portion of the vehicle, and also by means of a drive shaft 54 to the wheels which are positioned under the cab and engine portion of the vehicle. Each drive shaft, such as the drive shaft 54, which is coupled to a differential gear housing 52 incorporates a universal joint and splined coupling arrangement, represented by the symbol designated 74 at each end thereof, as already described. By means of this particular arrangement of the power train, each individual axle is free to move up and down as the truck travels along over uneven terrain while still receiving power from the engine. In addition, universal joint and splined coupling arrangements 74 are shown with the drive shafts 68 to take care of any possible misalignment or relative motion between the transfer cases 72, 73, the gear box 70, and the transmission 67.

There has thus been described one particular arrangement in accordance with the invention which provides a load carrying vehicle which is peculiarly suited for transporting loads over rough or slippery terrain without dependence upon graded roads. By virtue of the combination of a fluid suspension system which serves to distribute the load evenly at all wheels, regardless of terrain encountered, with a drive system which supplies power to each individual axle of the vehicle, the damage or destruction to tires from undue overloading as bumps are encountered is advantageously minimized or eliminated, and improved traction is achieved which permits the vehicle to operate over many kinds of uneven and slippery terrain which has not hitherto been traversable by wheeled vehicles. Although there have been described above specific arrangements of an overland transport vehicle in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. An overland transport vehicle comprising a truck frame, a plurality of wheels spatially distributed substantially equally along the length of the truck, a fluid suspension system suspending said wheels from said frame, said system comprising individual expandible wheel cylinders each including an actuator shaft, a header tube connecting the wheel cylinders along one side of the truck, and flexible coupling means individually extending between each of the wheel cylinders along one side and the associated header tube; means for applying driving torque to each of said wheels individually, a plurality of axles connected between corresponding pairs of said wheels, a single sway bar for each axle extending from one side of said truck frame to the corresponding axle at the opposite side thereof, and means for controlling the longitudinal movement of an axle relative to the truck frame comprising a first sway brace mounted longitudinally between the frame and the axle on one side of the truck frame and a pair of second sway braces mounted longitudinally between the frame and the axle on the opposite side thereof, said second sway braces being arranged in a pantograph configuration to prevent rotation of the axle housing, a plurality of support elements individually secured to corresponding axles to connect corresponding wheel cylinder actuator shafts to said axles, and means connecting the sway braces to said support elements.

2. An overland transport vehicle in accordance with claim 1 wherein said fluid suspension system is substantially filled with hydraulic fluid with said individual wheel cylinders approximately 50% extended, and further comprising a compression tank containing gas under pressure and individually connected to the header tube in fluid exchanging relationship therewith.

References Cited by the Examiner

UNITED STATES PATENTS

| | | | |
|---|---|---|---|
| 1,835,112 | 12/1931 | Hawkins | 280—104 |
| 2,574,986 | 11/1951 | Schou | 180—24 X |
| 2,707,110 | 4/1955 | Stover | 280—104.5 |
| 2,750,200 | 6/1956 | Scheel | 280—104.5 |
| 2,879,076 | 3/1959 | Stricker | 280—104.5 |
| 2,926,023 | 2/1960 | Kraus | 267—64 X |
| 3,085,796 | 4/1963 | Wettstein | 267—64 |
| 3,191,708 | 6/1965 | Simonds et al. | 180—24 X |

FOREIGN PATENTS 913,857    6/1954    Germany.

A. HARRY LEVY, *Primary Examiner.*